United States Patent
Imamura et al.

(10) Patent No.: US 10,879,543 B2
(45) Date of Patent: Dec. 29, 2020

(54) FUEL CELL VEHICLE

(71) Applicant: HONDA MOTOR CO., LTD., Tokyo (JP)

(72) Inventors: Yuki Imamura, Wako (JP); Choichi Ishikawa, Wako (JP); Norihisa Kobayashi, Wako (JP); Toshinobu Mito, Wako (JP); Mitsunori Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 610 days.

(21) Appl. No.: 15/297,136

(22) Filed: Oct. 19, 2016

(65) Prior Publication Data

US 2017/0113531 A1 Apr. 27, 2017

(30) Foreign Application Priority Data

Oct. 21, 2015 (JP) ................................ 2015-207246

(51) Int. Cl.
*B60K 1/04* (2019.01)
*H01M 8/0444* (2016.01)
(Continued)

(52) U.S. Cl.
CPC ..... *H01M 8/04089* (2013.01); *H01M 8/2475* (2013.01); *B60K 2001/0411* (2013.01); *H01M 2250/20* (2013.01); *Y02T 90/40* (2013.01)

(58) Field of Classification Search
CPC ......... H01M 2250/20; H01M 8/04089; H01M 8/2475
See application file for complete search history.

(56) References Cited

U.S. PATENT DOCUMENTS

| 5,144,799 A * | 9/1992 | Barth ...................... F01N 13/04 60/313 |
| 2003/0017798 A1* | 1/2003 | Hanaya ................ B60K 15/035 454/147 |

(Continued)

FOREIGN PATENT DOCUMENTS

| JP | 2000-225853 | 8/2000 |
| JP | 2003-034267 | 2/2003 |

(Continued)

OTHER PUBLICATIONS

Japanese Office Action for corresponding JP Application No. 2015-207246, dated Oct. 2, 2018 (w/ machine translation).

*Primary Examiner* — Sarah A. Slifka
*Assistant Examiner* — Brent C Thomas
(74) *Attorney, Agent, or Firm* — Mori & Ward, LLP

(57) ABSTRACT

A stack case includes a lower surface and at least one through hole. The lower surface is at a bottom of the stack case in a vehicle height direction of the vehicle. The at least one through hole opens to an inside of the stack case. An outer opening opens to an outside of a vehicle. The at least one vent pipe has one end and another end opposite to the one end along a length of the at least one vent pipe. The one end is connected to the at least one through hole provided in the stack case. The another end is connected to the outer opening in the vehicle body. The drain hole is provided in the lower surface of the stack case to be open to an inside of a motor compartment. The drain hole is located below the outer opening in the vehicle height direction.

22 Claims, 7 Drawing Sheets

(51) Int. Cl.
*B60K 11/06* (2006.01)
*H01M 8/04694* (2016.01)
*B60K 1/00* (2006.01)
*H01M 8/241* (2016.01)
*H01M 8/04082* (2016.01)
*H01M 8/04089* (2016.01)
*H01M 8/2475* (2016.01)

(56) References Cited

U.S. PATENT DOCUMENTS

| | | | | |
|---|---|---|---|---|
| 2006/0234106 | A1* | 10/2006 | Duffield | H01M 8/2484 |
| | | | | 429/458 |
| 2007/0248861 | A1* | 10/2007 | Hoshi | H01M 8/04029 |
| | | | | 429/435 |
| 2008/0025038 | A1* | 1/2008 | Chiang | B60Q 1/0005 |
| | | | | 362/547 |
| 2011/0111273 | A1* | 5/2011 | Okada | H01M 2/1077 |
| | | | | 429/88 |
| 2013/0034795 | A1* | 2/2013 | Matsumoto | H01M 8/2475 |
| | | | | 429/482 |
| 2015/0270562 | A1 | 9/2015 | Naito et al. | |

FOREIGN PATENT DOCUMENTS

| | | |
|---|---|---|
| JP | 2004-040950 | 2/2004 |
| JP | 2013-033676 | 2/2013 |

* cited by examiner

FUEL CELL VEHICLE

CROSS-REFERENCE TO RELATED APPLICATIONS

The present application claims priority under 35 U.S.C. § 119 to Japanese Patent Application No. 2015-207246, filed Oct. 21, 2015, entitled "Fuel Cell Vehicle." The contents of this application are incorporated herein by reference in their entirety.

BACKGROUND

1. Field

The present disclosure relates to a fuel cell vehicle.

2. Description of the Related Art

In general, a solid polymer electrolyte fuel cell includes a solid polymer electrolyte membrane, which is a polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and separators (bipolar plates), sandwiching the membrane electrode assembly therebetween, constitute a power generation cell (unit fuel cell). For example, a predetermined number of such power generation cells are stacked and mounted in a fuel cell vehicle as a vehicle fuel cell stack.

In the fuel cell vehicle, in particular, hydrogen, which is a fuel gas, may leak to a space in which the fuel cell stack is mounted. Japanese Unexamined Patent Application Publication No. 2004-040950, for example, discloses a fuel cell automobile developed for the purpose of efficiently discharging hydrogen leaked from the fuel cell stack.

The fuel cell automobile has a closed space in front of a passenger compartment, and a fuel cell is mounted in the closed space. As necessary, the fuel cell automobile has a first opening, which is formed at an upper part of the closed space, and a second opening, which is formed at a position at which a negative pressure is generated when the automobile is moving, so that hydrogen leaked from a fuel cell system into the closed space is discharged.

It is described that, in a case where an opening is formed at an upper part of the closed space, hydrogen leaked from the fuel cell system into the closed space can be reliably discharged to the outside, particularly when the automobile is not moving. It is also described that, in a case where an opening is formed at a position at which a negative pressure is generated, hydrogen leaked from the fuel cell system can be discharged from the closed space when the automobile is moving.

SUMMARY

According to one aspect of the present invention, a fuel cell vehicle includes a fuel cell stack including a plurality of power generation cells that are stacked and each of which generates electric power by causing an electrochemical reaction between a fuel gas and an oxidant gas, a stack case that accommodates the fuel cell stack, and a vehicle body having a motor compartment in which the stack case is mounted.

The fuel cell vehicle includes a vent pipe one end of which is connected to an opening formed in the stack case and the other end of which is connected to an outer opening that is formed in the vehicle body and that opens to the outside of the vehicle. A drain hole that opens in the motor compartment is formed in a lower surface of the stack case. The drain hole is located below the outer opening of the vehicle body in an up-down direction of the vehicle.

According to another aspect of the present invention, a fuel cell vehicle includes a fuel cell stack, a stack case, a vehicle body, at least one vent pipe, and a drain hole. The fuel cell stack includes a plurality of power generation cells. The plurality of power generation cells are stacked. The plurality of power generation cells are configured to generate electric power due to an electrochemical reaction between a fuel gas and an oxidant gas. The stack case accommodates the fuel cell stack. The stack case includes a lower surface and at least one through hole. The lower surface is at a bottom of the stack case in a vehicle height direction of the vehicle. The at least one through hole opens to an inside of the stack case. The vehicle body includes a motor compartment and an outer opening. The stack case is mounted in the motor compartment. The outer opening opens to an outside of the vehicle. The at least one vent pipe has one end and another end opposite to the one end along a length of the at least one vent pipe. The one end is connected to the at least one through hole provided in the stack case. The another end is connected to the outer opening in the vehicle body. The drain hole is provided in the lower surface of the stack case to be open to an inside of the motor compartment. The drain hole is located below the outer opening of the vehicle body in the vehicle height direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
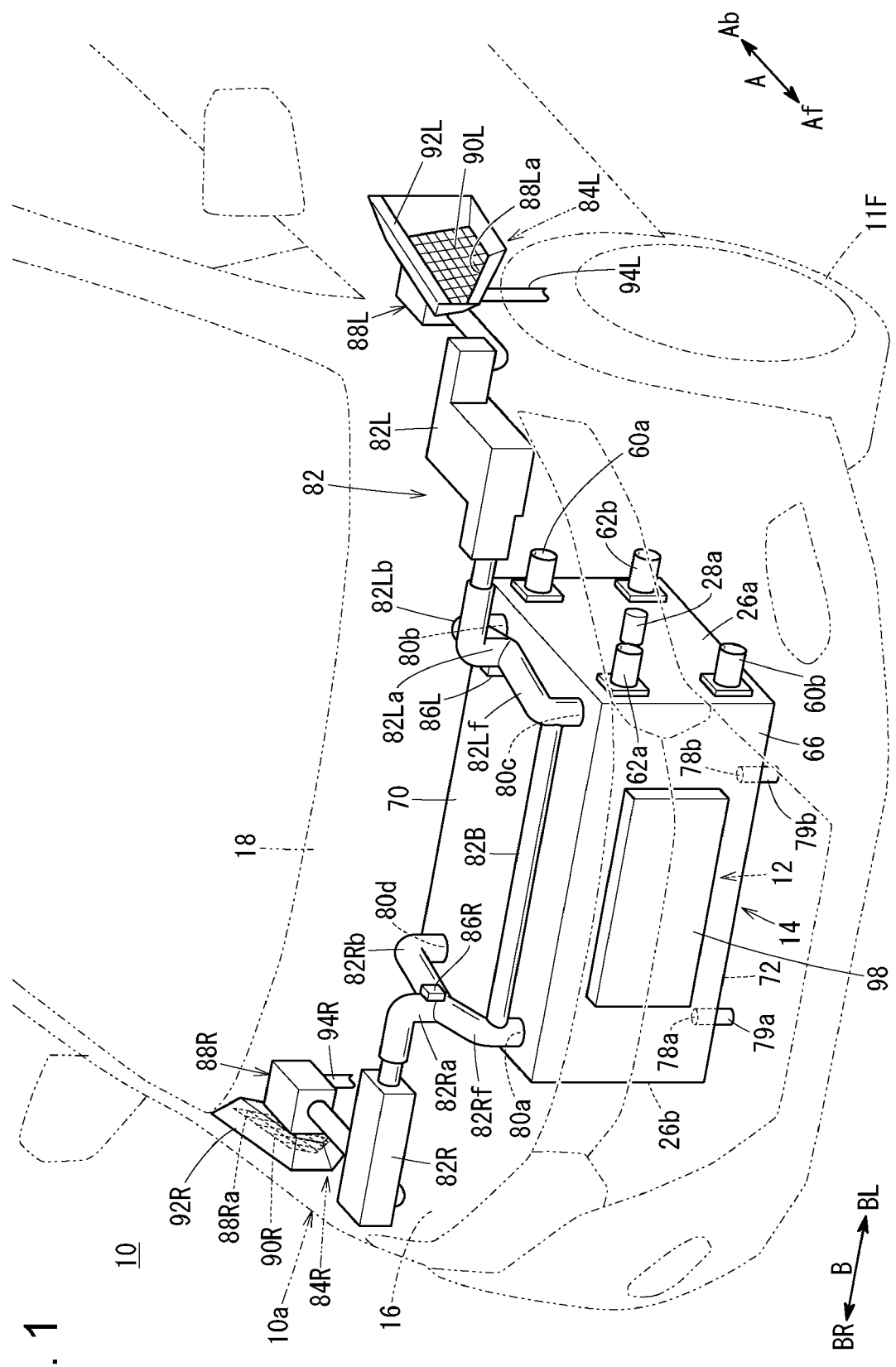
FIG. 1 is a schematic perspective view of a front portion of a fuel cell vehicle according to an embodiment of the present disclosure.

The embodiments will now be described with reference to the accompanying drawings, wherein like reference numerals designate corresponding or identical elements throughout the various drawings.

Figure 2:
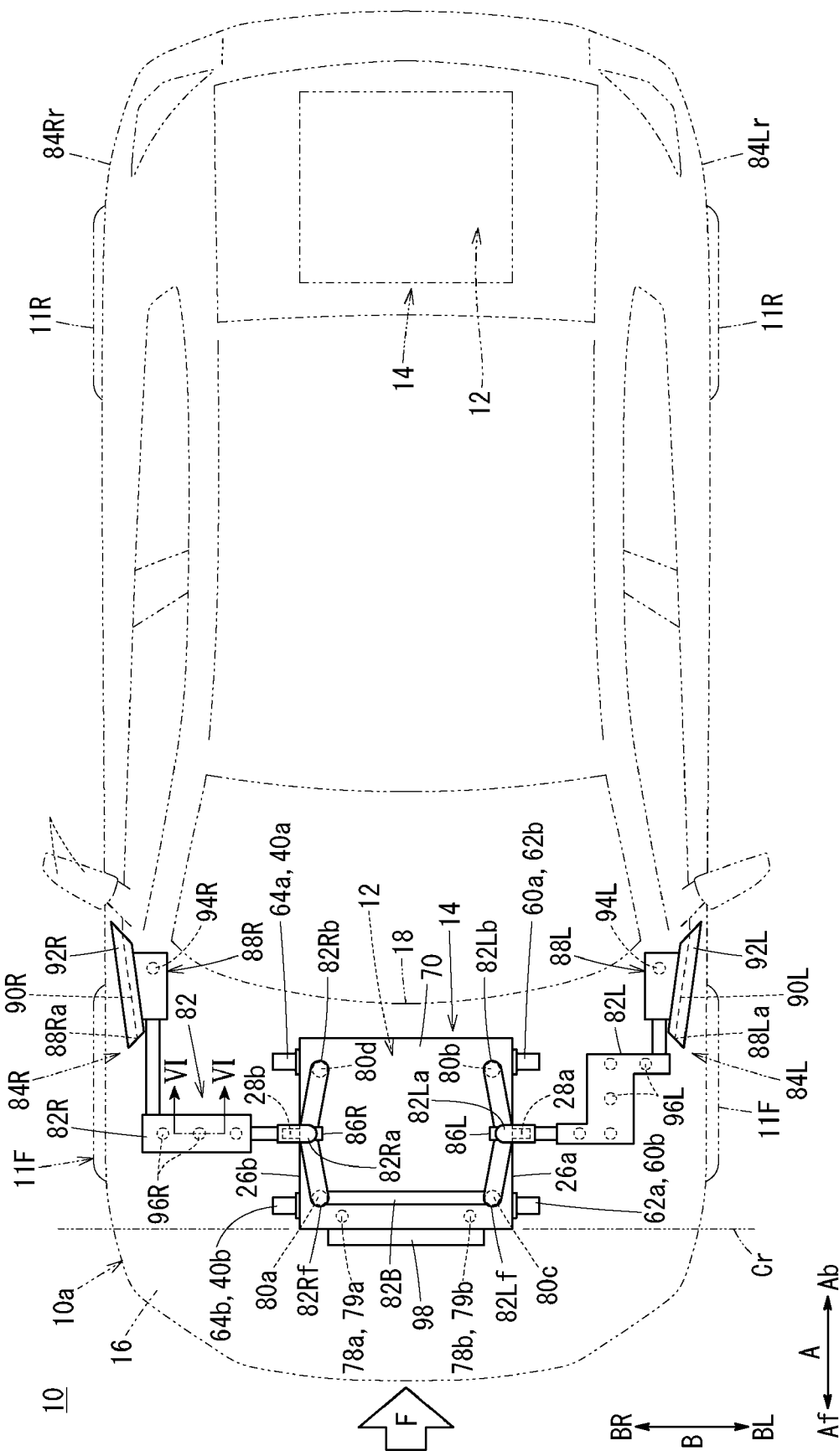
FIG. 2 is a schematic plan view of the fuel cell vehicle.
Figure 3:
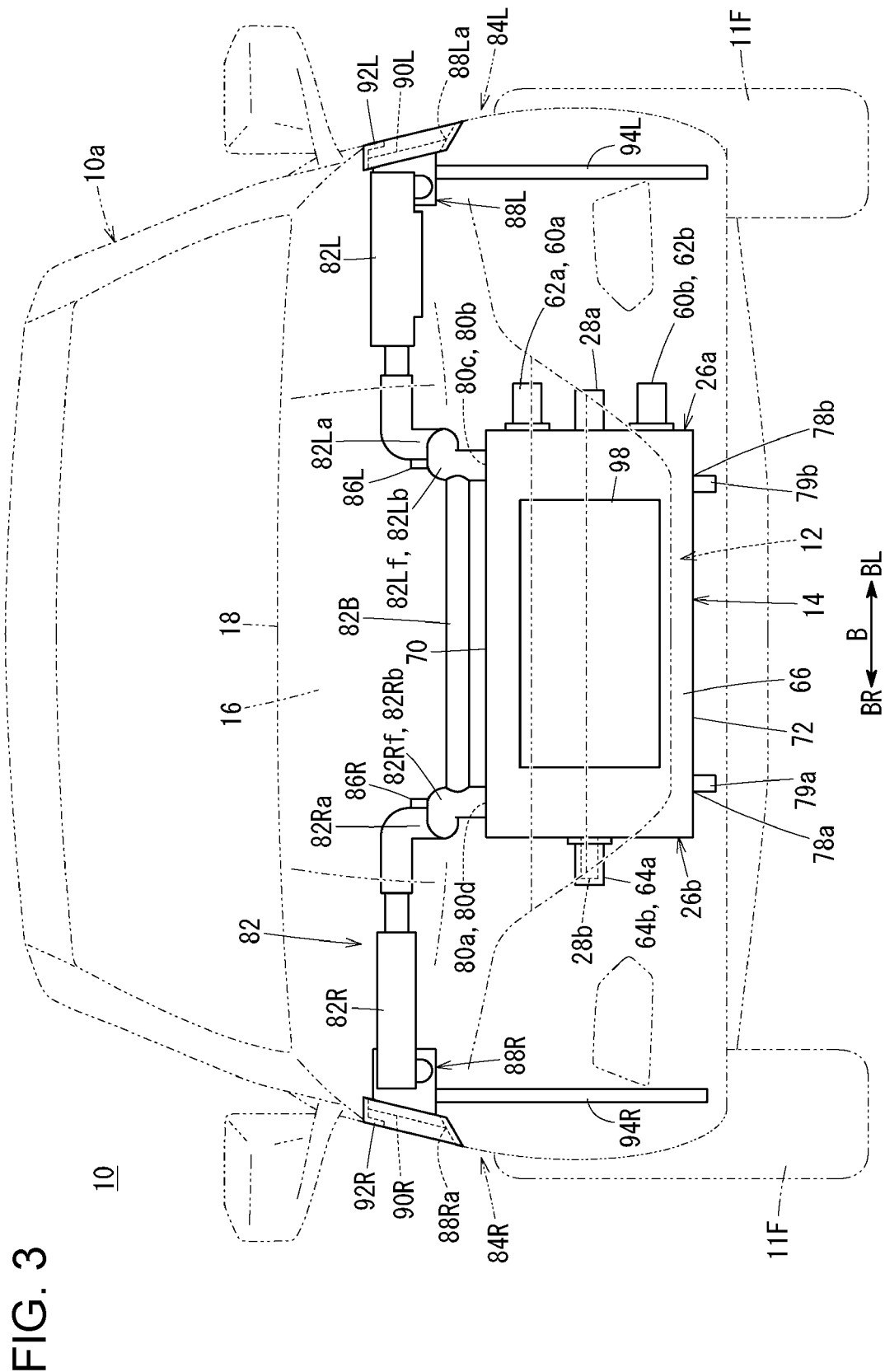
FIG. 3 is a schematic front view of the fuel cell vehicle.

Referring to FIGS. 1 to 3, a fuel cell vehicle 10 according to an embodiment of the present disclosure is, for example, a fuel cell electric automobile. The fuel cell vehicle 10 includes a vehicle body 10a including front wheels 11F and rear wheels 11R (see FIG. 2). In a part of the vehicle body 10a near the front wheels 11F, a motor compartment (front box) 16 is formed in front of a dashboard 18. A stack case 14, which accommodates a fuel cell stack 12, is mounted in the motor compartment 16.

Figure 4:
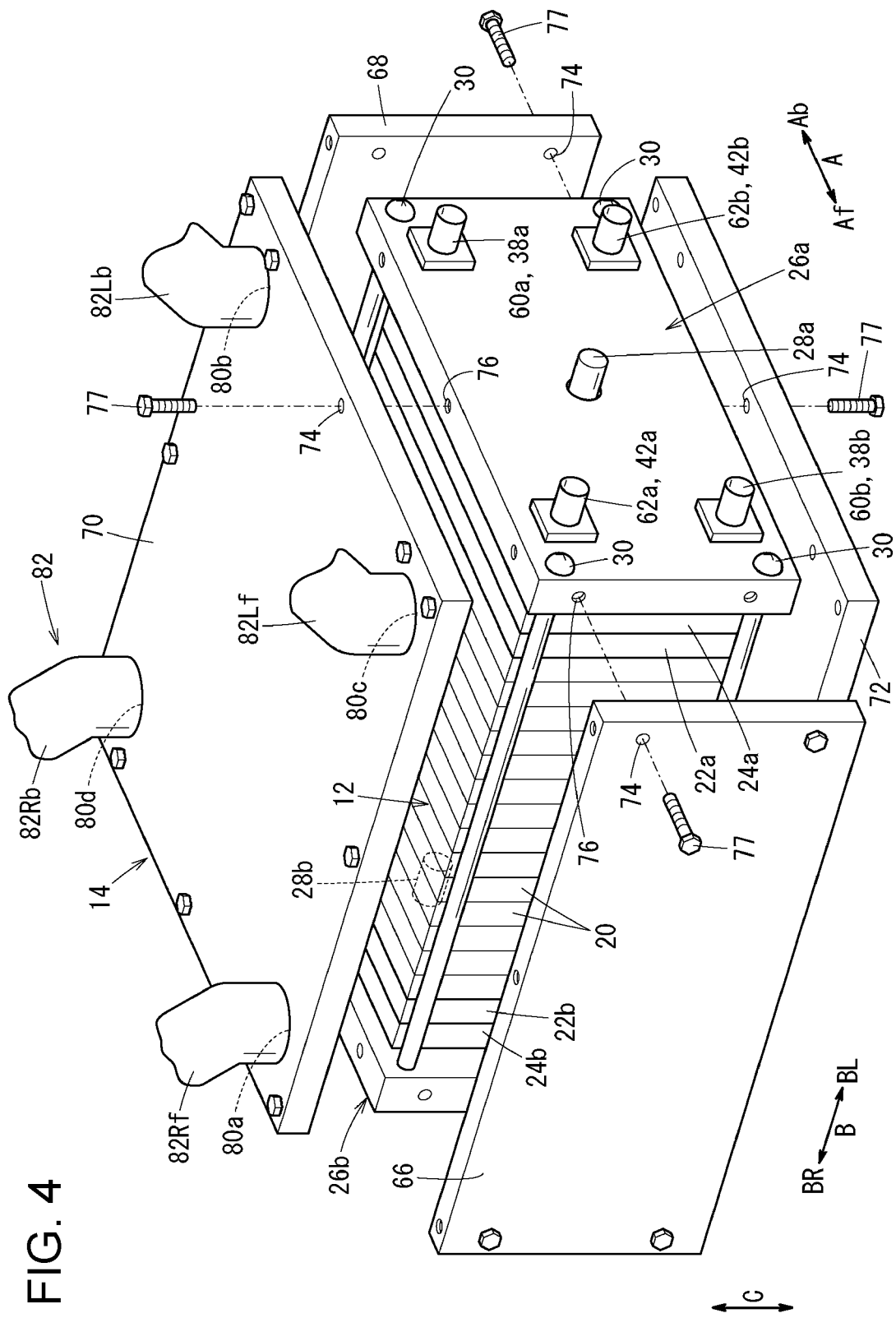
FIG. 4 is an exploded perspective view of a stack case that accommodates a fuel cell stack of the fuel cell vehicle.

Referring to FIG. 4, the fuel cell stack 12 includes a plurality of power generation cells 20 that are stacked in the vehicle width direction (direction of arrow B). At one end of the power generation cells 20 in the stacking direction, a first terminal plate 22a, a first insulation plate 24a, and a first end plate 26a are arranged outward.

At the other end of the power generation cells 20 in the stacking direction, a second terminal plate 22b, a second insulation plate 24b, and a second end plate 26b are arranged outward. The first end plate 26a and the second end plate 26b are disposed at both ends of the fuel cell stack 12 in the vehicle-width direction.

The first end plate 26a and the second end plate 26b each have outside dimensions greater than those of each power generation cell 20, the first insulation plate 24a, and the second insulation plate 24b. The first terminal plate 22a may be accommodated in a recess in the first insulation plate 24a. The second terminal plate 22b may be accommodated in a recess in the second insulation plate 24b.

A first electric power output terminal 28a, which is connected to the first terminal plate 22a, extends outward from a substantially central part (or from a position displaced from a central part) of the first end plate 26a, which has a horizontally elongated shape. A second electric power output terminal 28b, which is connected to the second terminal plate 22b, extends outward from a substantially central part (or from a position displaced from a central part) of the second end plate 26b, which has a horizontally elongated shape. Corner portions of the first end plate 26a and the second end plate 26b are fixed to each other through tie rods 30, which extend in the stacking direction, and a fastening load is applied to the fuel cell stack 12 in the stacking direction.

Figure 5:
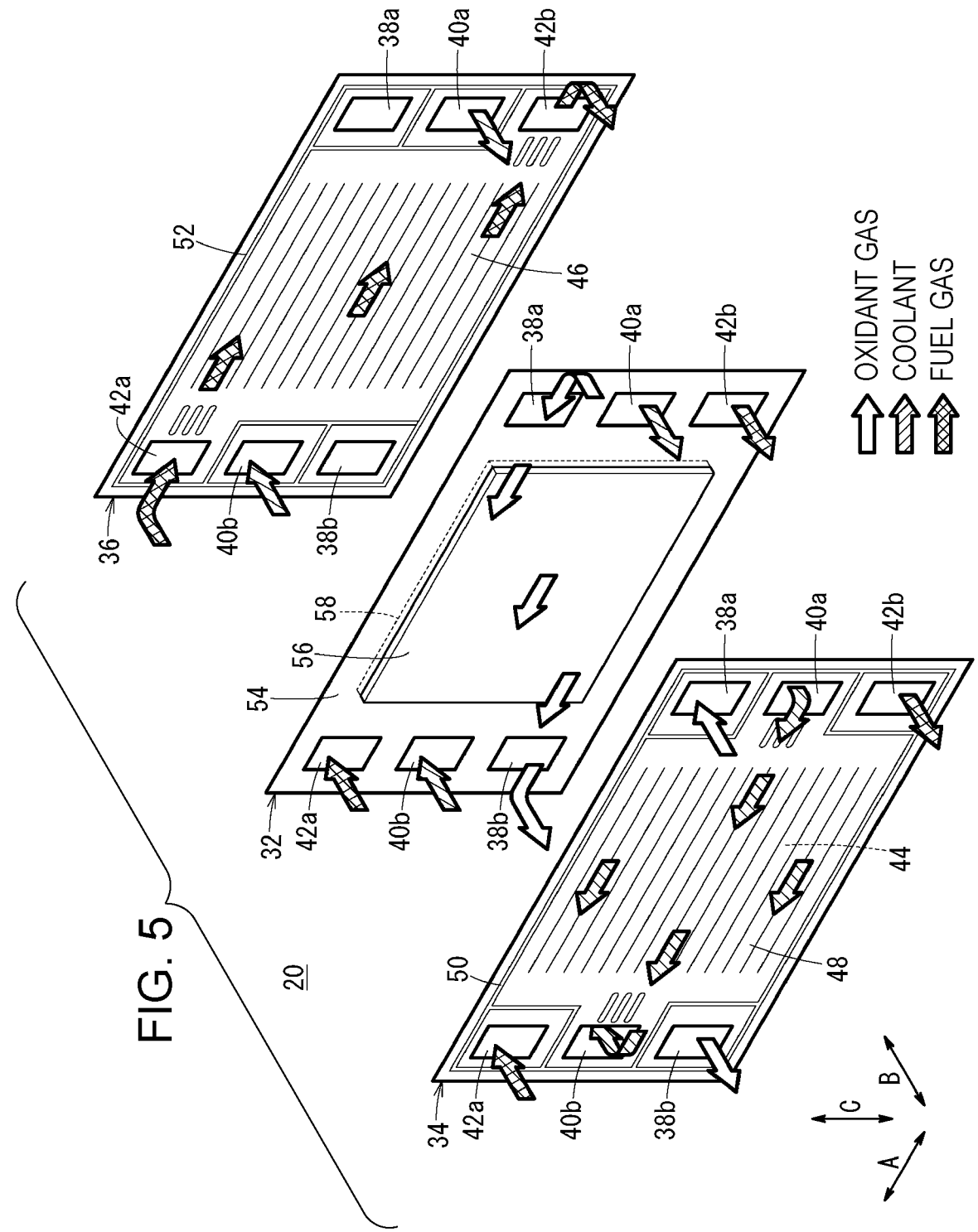
FIG. 5 is an exploded perspective view of a power generation cell of the fuel cell stack.

Referring to FIG. 5, in each power generation cell 20, a membrane electrode assembly 32 is sandwiched between a first separator 34 and a second separator 36. The first separator 34 and the second separator 36 are each a metal separator or a carbon separator.

An oxidant gas inlet manifold 38a, a coolant inlet manifold 40a, and a fuel gas outlet manifold 42b are formed in the power generation cell 20 so as to extend in the stacking direction (the direction of arrow B) through one end portion of the power generation cell 20 in the direction of arrow A. The oxidant gas inlet manifold 38a, the coolant inlet manifold 40a, and the fuel gas outlet manifold 42b are arranged in the direction of arrow C (vertical direction). An oxidant gas, such as an oxygen-containing gas, is supplied through the oxidant gas inlet manifold 38a. A coolant is supplied through the coolant inlet manifold 40a. A fuel gas, such as a hydrogen-containing gas, is discharged through the fuel gas outlet manifold 42b.

A fuel gas inlet manifold 42a, a coolant outlet manifold 40b, and an oxidant gas outlet manifold 38b are formed in the power generation cell 20 so as to extend in the direction of arrow B through the other end portion of the power generation cell 20 in the direction of arrow A. The fuel gas inlet manifold 42a, the coolant outlet manifold 40b, and the oxidant gas outlet manifold 38b are arranged in the direction of arrow C. The fuel gas is supplied through the fuel gas inlet manifold 42a, the coolant is discharged through the coolant outlet manifold 40b, and the oxidant gas is discharged through the oxidant gas outlet manifold 38b.

An oxidant gas channel 44, which is connected to the oxidant gas inlet manifold 38a and the oxidant gas outlet manifold 38b, is formed on a surface of the first separator 34 facing the membrane electrode assembly 32. A fuel gas channel 46, which is connected to the fuel gas inlet manifold 42a and the fuel gas outlet manifold 42b, is formed on a surface of the second separator 36 facing the membrane electrode assembly 32.

A coolant channel 48, which is connected to the coolant inlet manifold 40a and the coolant outlet manifold 40b, is formed between the first separator 34 of the power generation cell 20 and the second separator 36 of an adjacent power generation cell 20. A sealing member 50 and a sealing member 52 are integrally or independently formed on the first separator 34 and the second separator 36, respectively.

The membrane electrode assembly 32 includes a solid polymer electrolyte membrane 54 (cation exchange membrane) and a cathode electrode 56 and an anode electrode 58, which sandwich the solid polymer electrolyte membrane 54. The solid polymer electrolyte membrane 54 is, for example, a thin film that is made of a perfluorosulfonic acid polymer including water. The cathode electrode 56 and the anode electrode 58 each include a gas diffusion layer and an electrode catalyst layer. The gas diffusion layer is made of, for example, carbon paper. The electrode catalyst layer is formed by, for example, uniformly coating a surface of the first gas diffusion layer with porous carbon particles whose surfaces support a platinum alloy. The electrode catalyst layers are formed on both sides of the solid polymer electrolyte membrane 54.

Referring to FIG. 4, at one pair of opposite corners of the first end plate 26a, an external oxidant gas supply manifold 60a, which is connected to the oxidant gas inlet manifold 38a, and an external oxidant gas discharge manifold 60b, which is connected to the oxidant gas outlet manifold 38b, are disposed. At the other pair of opposite corners of the first end plate 26a, an external fuel gas supply manifold 62a, which is connected to the fuel gas inlet manifold 42a, and an external fuel gas discharge manifold 62b, which is connected to the fuel gas outlet manifold 42b, are disposed.

Referring to FIG. 2, on the second end plate 26b, an external coolant supply manifold 64a, which is connected to the coolant inlet manifold 40a, and an external coolant discharge manifold 64b, which is connected to the coolant outlet manifold 40b, are disposed.

Referring to FIG. 4, the fuel cell stack 12 is accommodated in the stack case 14, which has a quadrangular shape (for example, a rectangular shape) in plan view. The stack case 14 includes a front side panel 66, a back side panel 68, an upper panel 70, a lower panel 72, the first end plate 26a, and the second end plate 26b. Components of the stack case 14 are fixed to each other and to the first end plate 26a and the second end plate 26b by inserting screws 77 through holes 74 and by tightening the screws 77 into screw holes 76.

Referring to FIGS. 1 to 3, drain holes 78a and 78b are formed in a front portion of the lower panel 72 in the front-back direction of the vehicle (in the direction of arrow Af). Drain ducts 79a and 79b may be respectively connected to the drain holes 78a and 78b. One end of each of the drain ducts 79a and 79b is connected to a corresponding one of the drain holes 78a and 78b, and each of the drain ducts 79a and 79b extends vertically downward to the other end thereof. The drain holes 78a and 78b are disposed below outer openings 88Ra and 88La (described below) of the vehicle body 10a in the up-down direction of the vehicle (see FIGS. 1 and 2). In a case where the drain ducts 79a and 79b are not connected to the drain holes 78a and 78b, preferably, the drain holes 78a and 78b have covers for preventing entry of foreign matter.

Referring to FIGS. 1 and 4, at one pair of opposite corners of the upper panel 70, openings 80a and 80b, through which the inside of the stack case 14 is connected to the outside, are formed. At the other pair of opposite corners of the upper panel 70, openings 80c and 80d, through which the inside of the stack case 14 is connected to the outside, are formed. The openings 80a and 80c are formed at both side portions of a front portion of the stack case 14 (in the direction of arrow Af) so as to be located above the fuel gas inlet manifold 42a in the vertical direction. The openings 80b and 80d are formed at both side portions of a back portion of the stack case 14 (in the direction of arrow Ab).

A vent pipe 82 is connected the openings 80a to 80d. The vent pipe 82 includes two or more (in this example, two) right pipes 82Rf and 82Rb, which connect the stack case 14 and a right fender portion (right surface) 84R of the vehicle body 10a to each other. The vent pipe 82 includes two or more (in this example, two) left pipes 82Lf and 82Lb, which connect the stack case 14 and a left fender portion (left surface) 84L of the vehicle body 10a to each other. Both ends of a bypass pipe 82B, which is independent from the stack case 14 (exposed to the outside of the stack case 14), are connected to an intermediate portion of the right pipe 82Rf and an intermediate portion of the left pipe 82Lf.

One end of each of the right pipes 82Rf and 82Rb is connected to a corresponding one of the openings 80a and 80d. The other ends the right pipes 82Rf and 82Rb are joined to each other at a right joint portion 82Ra and connected to the right fender portion 84R as a single right exhaust duct 82R. A hydrogen sensor 86R is disposed at the right joint portion 82Ra.

One end of each of the left pipes 82Lf and 82Lb is connected to a corresponding one the openings 80c and 80b. The other ends the left pipes 82Lf and 82Lb are joined to each other at a left joint portion 82La and connected to the left fender portion 84L as a single left exhaust duct 82L. A hydrogen sensor 86L is disposed at the left joint portion 82La.

Referring to FIGS. 1 to 3, a right chamber member 88R is disposed in the right fender portion 84R, and a mesh member 90R is disposed in the outer opening 88Ra of the right chamber member 88R. A garnish 92R is formed on the front side of the right chamber member 88R so as to be located outward from the mesh member 90R. The garnish 92R blocks entry of foreign matter into the right chamber member 88R.

One end of a right drain pipe 94R, which is connected to an inner chamber, is connected the lower end of the right fender portion 84R. The right drain pipe 94R extends in the vertical direction, and a lower end portion of the right drain pipe 94R is located below a lower portion of the stack case 14 (see FIG. 3).

Referring to FIGS. 1 to 3, a left chamber member 88L is disposed in the left fender portion 84L, and a mesh member 90L is disposed in the outer opening 88La of the left chamber member 88L. A garnish 92L is formed on the front side of the left chamber member 88L so as to be located outward from the mesh member 90L. The garnish 92L blocks entry of foreign matter into the left chamber member 88L.

One end of a left drain pipe 94L, which is connected to an inner chamber, is connected the lower end of the left fender portion 84L. The left drain pipe 94L extends in the vertical direction, and a lower end portion of the left drain pipe 94L is disposed below a lower portion of the stack case 14 (see FIG. 3).

Figure 6:
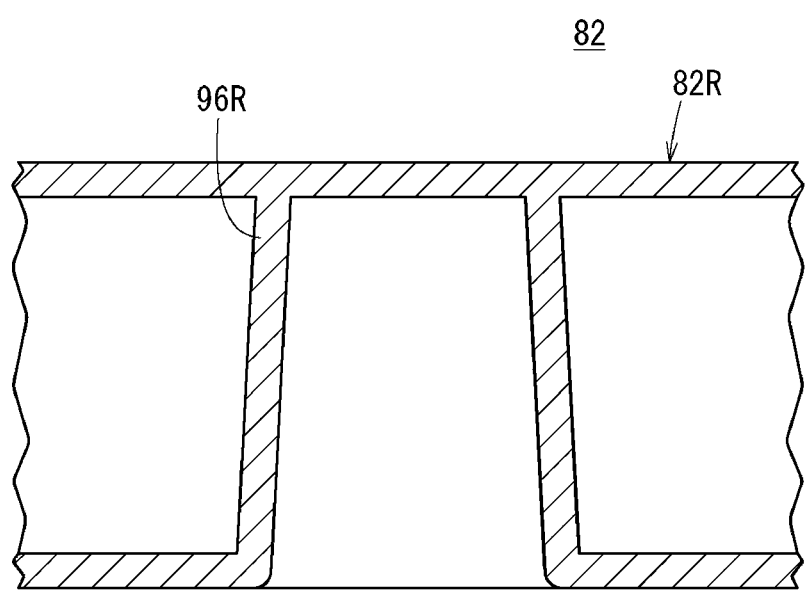
FIG. 6 is a cross-sectional view of a vent pipe of the fuel cell vehicle, taken along line VI-VI in FIG. 2.

Referring to FIG. 2, a plurality of reinforcement protrusions 96R and a plurality of reinforcement protrusions 96L are respectively formed in the right exhaust duct 82R and the left exhaust duct 82L. Referring to FIG. 6, each protrusion 96R is formed in the right exhaust duct 82R so as to have a substantially frusto-conical shape (or a cylindrical shape). Each protrusion 96L is formed in the same way as the protrusion 96R. For example, the distances between the protrusions 96R and the distances between the protrusions 96L are set so that the protrusions 96R and 96L are disposed at positions to which a load is likely to be applied when a hand of an operator touches. Thus, the protrusions 96R and 96L serve as load-receiving pillars.

Referring to FIGS. 1 to 3, a fuel cell ECU 98 is disposed in front of the stack case 14 in the front-back direction of the vehicle (in the direction of arrow Af). That is, the fuel cell ECU 98 is attached to the front side panel 66. The fuel cell ECU 98, which is a device that becomes incapable of performing system start-up (in particular, start-up of the fuel cell stack 12) when the vehicle becomes inoperable due to malfunction or crash, is disposed in front of the bypass pipe 82B and the vent pipe 82.

Referring to FIG. 2, the fuel cell ECU 98 is disposed in a crumple zone Cr, which is a zone of the vehicle body 10a that easily crumples when an external load F (a collision load or the like) is applied to the fuel cell vehicle 10 from the front side. Instead of the fuel cell ECU 98, another device having the same function may be disposed on the front side panel 66.

The right exhaust duct 82R opens to the right fender portion 84R of the vehicle body 10a of the fuel cell vehicle 10. The left exhaust duct 82L opens to the left fender portion 84L of the vehicle body 10a. An elastic hose may be connected to an intermediate portion of each of the right exhaust duct 82R and the left exhaust duct 82L. The right exhaust duct 82R and the left exhaust duct 82L may each have a flat shape extending in a horizontal direction.

The fuel cell stack 12 is fixed the vehicle frame by using mount members (not shown) attached to the first end plate 26a and the second end plate 26b.

An operation of the fuel cell vehicle 10, which is structured as described above, will be described.

Referring to FIG. 4, when the fuel cell vehicle 10 is driven, a fuel gas is supplied from the external fuel gas supply manifold 62a of the first end plate 26a to the fuel gas inlet manifold 42a. An oxidant gas is supplied from the external oxidant gas supply manifold 60a of the first end plate 26a to the oxidant gas inlet manifold 38a.

Referring to FIG. 5, the fuel gas flows from the fuel gas inlet manifold 42a into the fuel gas channel 46 of the second separator 36. The fuel gas is supplied to the anode electrode 58 of the membrane electrode assembly 32 while flowing in the direction of arrow A.

The oxidant gas flows from the oxidant gas inlet manifold 38a into the oxidant gas channel 44 of the first separator 34. The oxidant gas is supplied to the cathode electrode 56 of the membrane electrode assembly 32 while flowing in the direction of arrow A.

Accordingly, in the membrane electrode assembly 32, the fuel gas supplied to the anode electrode 58 and the oxidant gas supplied to the cathode electrode 56 cause electrochemical reactions in the electrode catalyst layers, and thereby electric power is generated.

Referring to FIG. 4, the fuel gas is discharged from the fuel gas outlet manifold 42b to the external fuel gas discharge manifold 62b of the first end plate 26a. The oxidant gas is discharged from the oxidant gas outlet manifold 38b to the external oxidant gas discharge manifold 60b of the first end plate 26a.

Referring to FIG. 2, a coolant is supplied from the external coolant supply manifold 64a of the second end plate 26b to the coolant inlet manifold 40a. Referring to FIG. 5, the coolant flows into the coolant channel 48 between the first separator 34 and the second separator 36. After cooling the membrane electrode assembly 32, the coolant flows through the coolant outlet manifold 40b and is discharged to the external coolant discharge manifold 64b.

In the present embodiment, referring to FIG. 3, the drain holes 78a and 78b, which open in the motor compartment 16, are formed in the lower panel 72, which is the lower surface of the stack case 14. Referring to FIGS. 1 and 2, the drain holes 78a and 78b are located below the outer openings 88Ra and 88La of the vehicle body 10a in the up-down direction of the vehicle.

Therefore, outside air can easily flow into the stack case 14 from the lower surface of the stack case 14. Accordingly, a fuel gas that has leaked into the stack case 14 flows through the vent pipe 82 and is discharged to the outside from the outer openings 88Ra and 88La of the vehicle body 10a. Thus, it is possible to easily and reliably discharge the fuel gas that has leaked into the stack case 14 to the outside of the vehicle body 10a with a simple structure.

Condensation water in the stack case 14 is smoothly discharged to the motor compartment 16 from the drain holes 78a and 78b. Therefore, it is possible to reliably suppress retention of water in the stack case 14.

Referring to FIGS. 1 to 3, the vent pipe 82 includes the two right pipes 82Rf and 82Rb, which connect the stack case 14 and the right fender portion 84R of the vehicle body 10a to each other. The vent pipe 82 includes the two left pipes 82Lf and 82Lb, which connect the stack case 14 and the left fender portion 84L of the vehicle body 10a to each other. Both ends of the bypass pipe 82B, which is independent from the stack case 14, are connected to an intermediate portion of the right pipe 82Rf and an intermediate portion of the left pipe 82Lf.

Figure 7:
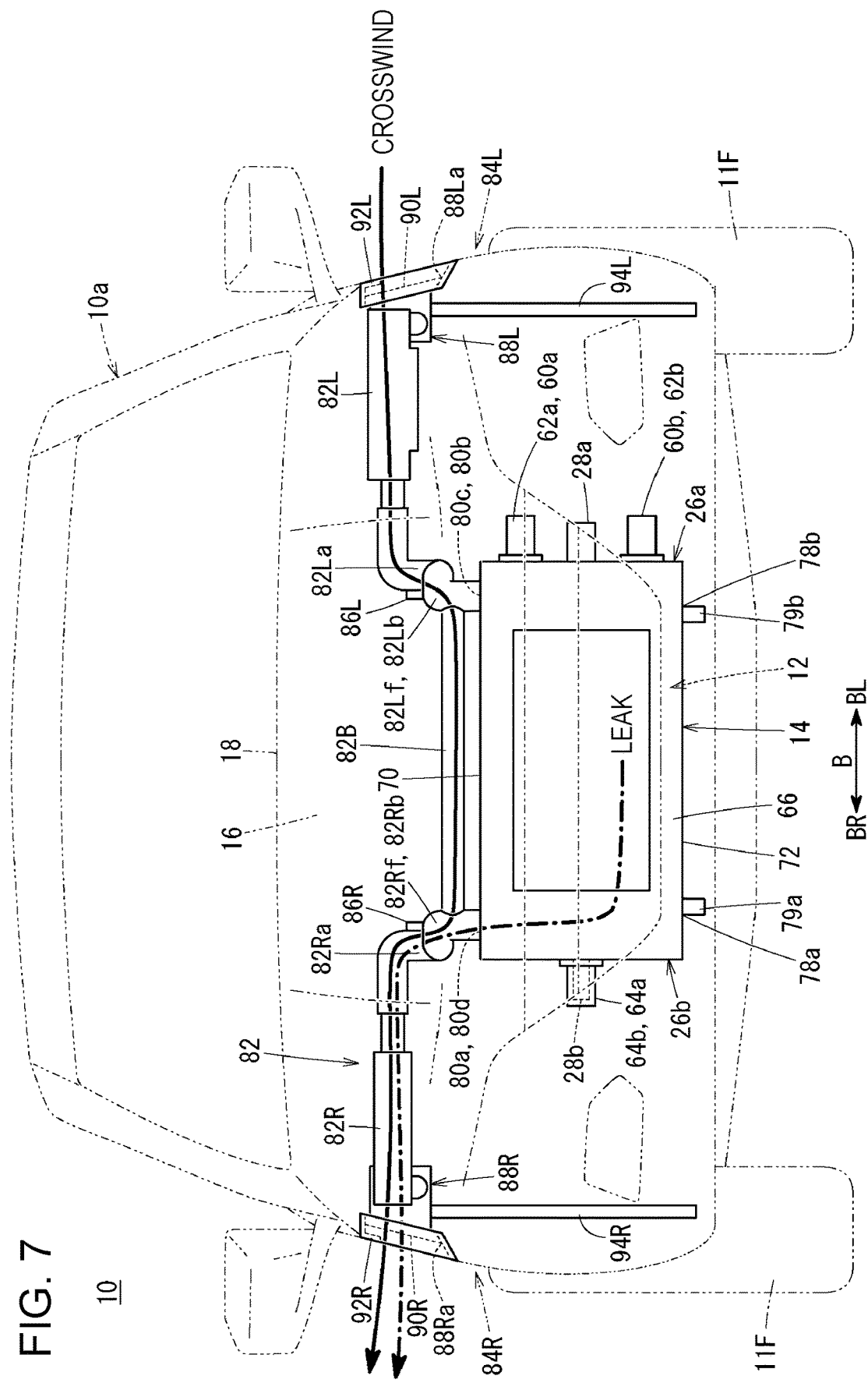
FIG. 7 illustrates the fuel cell vehicle when a crosswind is blowing against the vehicle.

Accordingly, referring to FIG. 7, for example, when a crosswind blows against the left surface of the vehicle body 10a, the crosswind flows from the left fender portion 84L through the outer opening 88La into the left chamber member 88L. The crosswind passes through the left exhaust duct 82L and the left pipe 82Lf into the bypass pipe 82B, bypasses the inside of the stack case 14, and flows through the right pipe 82Rf to the right exhaust duct 82R. Then, the crosswind is discharged from the outer opening 88Ra of the right chamber member 88R to the outside of the right fender portion 84R.

This produces an effect that it is possible to reduce the probability that the crosswind flows into the stack case 14, passes through the drain hole 78b (and 78a) and the drain duct 79b, and is discharged to the inside of the motor compartment 16.

The left pipes 82Lf and 82Lb and the right pipes 82Rf and 82Rb are connected to the four corners of the upper surface of the stack case 14. The hydrogen sensors 86L and 86R are disposed at the left joint portion 82La of the left pipes 82Lf and 82Lb and the right joint portion 82Ra of the right pipes 82Rf and 82Rb. Therefore, it is possible to effectively reduce the number of hydrogen sensors that are necessary and to quickly detect leakage of hydrogen.

The left drain pipe 94L is disposed near the outer opening 88La, and the right drain pipe 94R is disposed near the outer opening 88Ra. Accordingly, foreign matter or water that has entered through the outer openings 88La and 88Ra does not enter into the left exhaust duct 82L and the right exhaust duct 82R and is reliably discharged. Thus, it is possible to reduce the probability that foreign matter or water enters the fuel cell stack 12.

Moreover, referring to FIG. 3, the lower end portions of the left drain pipe 94L and the right drain pipe 94R are located below the lower portion of the stack case 14. Therefore, the left drain pipe 94L and the right drain pipe 94R are comparatively long and have high flow resistance. Accordingly, it is possible to reliably suppress discharge of hydrogen from the left drain pipe 94L and the right drain pipe 94R.

A device that becomes incapable of performing system start-up when the vehicle becomes inoperable, such as the fuel cell ECU 98, is disposed in front of the stack case 14 in the front-back direction of the vehicle. Thus, referring to FIG. 2, when an external load F is applied from the front side of the vehicle body 10a, the external load F is applied to the fuel cell ECU 98 before being applied to the vent pipe 82, in particular, the bypass pipe 82B. Therefore, the fuel cell ECU 98 becomes broken before the vent pipe 82 does, and the fuel cell ECU 98 becomes incapable of performing system start-up. Accordingly, system start-up is not unnecessarily performed in a state in which, for example, the bypass pipe 82B is broken.

Referring to FIG. 2, the plurality of protrusions 96R and the plurality of protrusions 96L are respectively formed in the right exhaust duct 82R and the left exhaust duct 82L. Accordingly, for example, even when a load is applied to the right exhaust duct 82R or the left exhaust duct 82L during a maintenance operation, it is possible to effectively prevent occurrence of deformation, such as a dent, in the right exhaust duct 82R or the left exhaust duct 82L.

In the present embodiment, an isolated structure that is continuous from the stack case 14, which accommodates the fuel cell stack 12, to the vent pipe 82 is formed. By appropriately setting the internal volume of the isolated structure, for example, even when the outer opening 88La and 88Ra are blocked due to snowfall or the like, it is possible to prevent discharge of hydrogen to the motor compartment 16.

To be specific, when the hydrogen sensor 86L or 86R detects an increase of the hydrogen concentration in the vent pipe 82, whether the hydrogen concentration is less than a flammable concentration is determined. If it is determined that the detected hydrogen concentration is higher than or equal to the flammable concentration, supply of hydrogen (fuel gas) from the hydrogen supply system is stopped. Even if the outer openings 88La and 88Ra are blocked and leaked hydrogen is retained in the isolated structure, since the internal volume of the isolation structure including the vent pipe 82 and the stack case 14 is sufficiently large, the concentration of hydrogen can be prevented from exceeding the flammable concentration.

In the present embodiment, referring to FIG. 2, the stack case 14, which accommodates the fuel cell stack 12, may be disposed in a rear portion of the vehicle body 10a. In this case, the vent pipe 82 is connected to a left fender portion 84Lr and a right fender portion 84Rr above the rear wheels 11R.

The first end plate 26a and the second end plate 26b are used as structural members of the stack case 14. However, this is not a limitation. For example, the fuel cell stack 12 may be accommodated in an independent rectangular stack case.

According to the present disclosure, a fuel cell vehicle includes a fuel cell stack including a plurality of power generation cells that are stacked and each of which generates electric power by causing an electrochemical reaction between a fuel gas and an oxidant gas, a stack case that accommodates the fuel cell stack, and a vehicle body having a motor compartment in which the stack case is mounted.

The fuel cell vehicle includes a vent pipe one end of which is connected to an opening formed in the stack case and the other end of which is connected to an outer opening that is formed in the vehicle body and that opens to the outside of the vehicle. A drain hole that opens in the motor compartment is formed in a lower surface of the stack case. The drain hole is located below the outer opening of the vehicle body in an up-down direction of the vehicle.

In the fuel cell vehicle, preferably, the vent pipe includes a left pipe that connects the stack case and a left surface of the vehicle body to each other, and a right pipe that connects the stack case and a right surface of the vehicle body to each other. In this case, preferably, the fuel cell vehicle includes a bypass pipe that connects the left pipe and the right pipe to each other and that is independent from the stack case.

In the fuel cell vehicle, two or more of the left pipes and two or more of the right pipes are connected to four corners of an upper surface of the stack case. In this case, preferably, the fuel cell vehicle includes a left joint portion at which the two or more left pipes are joined together and a right joint portion at which the two or more right pipes are joined together, and a hydrogen sensor is disposed at each of the left joint portion and the right joint portion.

In the fuel cell vehicle, preferably, a drain pipe is disposed near the outer opening of the vehicle body.

In the fuel cell vehicle, preferably, a lower end portion of the drain pipe is located below a lower portion of the stack case.

In the fuel cell vehicle, preferably, a device that becomes incapable of performing system start-up when the vehicle becomes inoperable is disposed in front of the stack case in a front-back direction of the vehicle so as to be located in front of the bypass pipe.

In the fuel cell vehicle, preferably, a reinforcement protrusion is disposed in the vent pipe.

With the present disclosure, the drain hole, which opens in the motor compartment, is formed in the lower surface of the stack case; and the drain hole is located below the outer opening of the vehicle body, which is connected to the vent pipe, in the up-down direction of the vehicle. Accordingly, air flows into the stack case from the lower surface of the stack case, and therefore the fuel gas that has leaked into the stack case flows through the vent pipe and is discharged to the outside from the outer opening of the vehicle body. Thus, it is possible to easily and reliably discharge the fuel gas that has leaked into the stack case to the outside of the vehicle with a simple structure.

Condensation water in the stack case is smoothly discharged from the drain hole. Therefore, it is possible to reliably suppress retention of water in the stack case.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:
a fuel cell stack including a plurality of power generation cells that are stacked and each of which generates electric power by causing an electrochemical reaction between a fuel gas and an oxidant gas;
a stack case that accommodates the fuel cell stack;
a vehicle body having a motor compartment in which the stack case is mounted;
a vent pipe one end of which is connected to an opening formed in the stack case and the other end of which is connected to an outer opening that is formed in the vehicle body and that opens to the outside of the vehicle; and
a control device that becomes incapable of performing system start-up when the vehicle becomes inoperable,
wherein a drain hole that opens in the motor compartment is formed in a lower surface of the stack case,
wherein the drain hole is located below the outer opening of the vehicle body in an up-down direction of the vehicle,
wherein the vent pipe includes
  a left pipe that connects the stack case and a left surface of the vehicle body to each other, the left pipe discharges fuel gas leaked from the fuel cell stack, and
  a right pipe that connects the stack case and a right surface of the vehicle body to each other, the right pipe discharges fuel gas leaked from the fuel cell stack,
wherein the fuel cell vehicle includes a bypass pipe that connects the left pipe and the right pipe to each other and that is independent from the stack case,
wherein the vent pipe and the bypass pipe are provided above the stack case,
wherein the control device is disposed on a front side panel of the stack case in front of the stack case in a front-back direction of the vehicle so as to be located in front of the bypass pipe, and
wherein a first reinforcement protrusion is disposed in the vent pipe, the first reinforcement protrusion extending in a first direction perpendicular to airflow through the vent pipe at a first location at which the first reinforcement protrusion is provided, the first reinforcement protrusion extending from a lower surface of the vent pipe to an upper surface of the vent pipe, the first reinforcement protrusion being attached to the lower surface of the vent pipe and the upper surface of the vent pipe, the first reinforcement protrusion has a shape with an axis extending in the first direction.

2. The fuel cell vehicle according to claim 1,
wherein two or more of the left pipes and two or more of the right pipes are connected to four corners of an upper surface of the stack case,
wherein the fuel cell vehicle includes a left joint portion at which the two or more left pipes are joined together and a right joint portion at which the two or more right pipes are joined together, and
wherein a hydrogen sensor is disposed at each of the left joint portion and the right joint portion.

3. The fuel cell vehicle according to claim 1,
wherein a drain pipe is disposed near the outer opening of the vehicle body.

4. The fuel cell vehicle according to claim 3,
wherein a lower end portion of the drain pipe is located below a lower portion of the stack case.

5. A fuel cell vehicle comprising:
a fuel cell stack comprising:
  a plurality of power generation cells stacked and configured to generate electric power due to an electrochemical reaction between a fuel gas and an oxidant gas;
a stack case accommodating the fuel cell stack and comprising:
  a lower surface at a bottom of the stack case in a vehicle height direction of the vehicle; and
  at least one through hole opening to an inside of the stack case;
a vehicle body comprising:
  a motor compartment in which the stack case is mounted; and
  an outer opening to an outside of the vehicle;
at least one vent pipe having one end and another end opposite to the one end along a length of the at least one vent pipe, the one end being connected to the at least one through hole provided in the stack case, the another end being connected to the outer opening in the vehicle body;
a drain hole provided in the lower surface of the stack case to be open to an inside of the motor compartment and located below the outer opening of the vehicle body in the vehicle height direction; and
a control device that becomes incapable of performing system start-up when the vehicle becomes inoperable,
wherein the at least one vent pipe includes
  at least one left pipe connecting the stack case and a left surface of the vehicle body, the at least one left pipe discharges fuel gas leaked from the fuel cell stack, and
  at least one right pipe connecting the stack case and a right surface of the vehicle body, the at least one right pipe discharges fuel gas leaked from the fuel cell stack,
wherein the fuel cell vehicle includes a bypass pipe which connects the at least one left pipe and the at least one right pipe and which is independent from the stack case,
wherein the at least one vent pipe and the bypass pipe are provided above the stack case,
wherein the control device is disposed on a front side panel of the stack case in front of the stack case in a front-back direction of the vehicle so as to be located in front of the bypass pipe, and
wherein a first reinforcement protrusion is disposed in the at least one vent pipe, the first reinforcement protrusion extending in a first direction perpendicular to airflow through the at least one vent pipe at a first location at which the first reinforcement protrusion is provided, the first reinforcement protrusion extending from a lower surface of the at least one vent pipe to an upper surface of the at least one vent pipe, the first reinforcement protrusion being attached to the lower surface of the at least one vent pipe and the upper surface of at least one the vent pipe, the first reinforcement protrusion has a shape with an axis extending in the first direction.

6. The fuel cell vehicle according to claim 5,
wherein the at least one left pipe includes two or more left pipes,
wherein the at least one right pipe includes two or more right pipes,
wherein the two or more left pipes and the two or more right pipes are connected to four corners of an upper surface of the stack case,
wherein the fuel cell vehicle includes a left joint portion at which the two or more left pipes are joined together and a right joint portion at which the two or more right pipes are joined together, and
wherein a hydrogen sensor is disposed at each of the left joint portion and the right joint portion.

7. The fuel cell vehicle according to claim 5,
wherein a drain pipe is disposed near the outer opening of the vehicle body.

8. The fuel cell vehicle according to claim 7,
wherein a lower end portion of the drain pipe is located below a lower portion of the stack case.

9. The fuel cell vehicle according to claim 1,
wherein the first reinforcement protrusion has a frusto-conical shape.

10. The fuel cell vehicle according to claim 1,
wherein the control device is a fuel cell electronic control unit.

11. The fuel cell vehicle according to claim 1,
wherein the control device is mounted in a crumple zone of the vehicle body that crumples when an external load is applied to the fuel cell vehicle from a front side of the vehicle body.

12. The fuel cell vehicle according to claim 5,
wherein the first reinforcement protrusion has a frusto-conical shape.

13. The fuel cell vehicle according to claim 5,
wherein the control device is a fuel cell electronic control unit.

14. The fuel cell vehicle according to claim 5,
wherein the control device is mounted in a crumple zone of the vehicle body that crumples when an external load is applied to the fuel cell vehicle from a front side of the vehicle body.

15. The fuel cell vehicle according to claim 1,
wherein the vehicle has a left fender with the outer opening facing outward in a leftward direction of the vehicle and a right fender with the outer opening facing outward in a rightward direction of the vehicle,
wherein the left pipe connects the stack case to the outer opening of the left fender and the right pipe connects the stack case to the outer opening of the right fender to discharge fuel gas leaked from the fuel cell stack,
wherein the outer opening of the left fender and the outer opening of the right fender are at least partially provided rearward of the fuel cell stack and the vent pipe in the front-back direction of the vehicle, and
wherein the outer opening of the left fender and the outer opening of the right fender are at least partially provided above of the fuel cell stack in the up-down direction of the vehicle.

16. The fuel cell vehicle according to claim 1,
wherein the fuel cell vehicle is configured such that a crosswind that blows against the left surface of the vehicle body flows into the left pipe into the bypass pipe bypasses an inside of the stack case and flows through the right pipe such that the crosswind is discharged from the right surface of the vehicle body.

17. The fuel cell vehicle according to claim 1,
wherein the first reinforcement protrusion has a cylindrical shape.

18. The fuel cell vehicle according to claim 1,
wherein a second reinforcement protrusion is disposed in the vent pipe, the second reinforcement protrusion extending in a second direction perpendicular to airflow through the vent pipe at a second location at which the second reinforcement protrusion is provided, the second reinforcement protrusion extending from the lower surface of the vent pipe to the upper surface of the vent pipe, the second reinforcement protrusion being attached to the lower surface of the vent pipe and the upper surface of the vent pipe, and wherein the second reinforcement protrusion has a frusto-conical shape or a cylindrical shape.

19. The fuel cell vehicle according to claim 5, wherein the vehicle has a left fender with the outer opening facing outward in a leftward direction of the vehicle and a right fender with the outer opening facing outward in a rightward direction of the vehicle, wherein the at least one left pipe connects the stack case to the outer opening of the left fender and the at least one right pipe connects the stack case to the outer opening of the right fender to discharge fuel gas leaked from the fuel cell stack, wherein the outer opening of the left fender and the outer opening of the right fender are at least partially provided rearward of the fuel cell stack and the vent pipe in the front-back direction of the vehicle, and wherein the outer opening of the left fender and the outer opening of the right fender are at least partially provided above of the fuel cell stack in the height direction of the vehicle.

20. The fuel cell vehicle according to claim 5, wherein the fuel cell vehicle is configured such that a crosswind that blows against the left surface of the vehicle body flows into the at least one left pipe into the bypass pipe bypasses the inside of the stack case and flows through the at least one right pipe such that the crosswind is discharged from the right surface of the vehicle body.

21. The fuel cell vehicle according to claim 5, wherein the first reinforcement protrusion has a cylindrical shape.

22. The fuel cell vehicle according to claim 5, wherein a second reinforcement protrusion is disposed in the at least one vent pipe, the second reinforcement protrusion extending in a second direction perpendicular to airflow through the at least one vent pipe at a second location at which the second reinforcement protrusion is provided, the second reinforcement protrusion extending from the lower surface of the at least one vent pipe to the upper surface of the at least one vent pipe, the second reinforcement protrusion being attached to the lower surface of the at least one vent pipe and the upper surface of the at least one vent pipe, and wherein the second reinforcement protrusion has a frusto-conical shape or a cylindrical shape.

* * * * *